United States Patent
Dubarry et al.

(10) Patent No.: US 10,991,922 B2
(45) Date of Patent: Apr. 27, 2021

(54) REALIZATION OF A MICROELECTRONIC DEVICE COLLECTOR

(71) Applicant: Commissariat A L'Energie Atomique et aux Energies Alternatives, Paris (FR)

(72) Inventors: Christophe Dubarry, Claix (FR); Francoise Geffraye, La Buisse (FR); Sami Oukassi, Saint-Egreve (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 108 days.

(21) Appl. No.: 16/226,697

(22) Filed: Dec. 20, 2018

(65) Prior Publication Data
US 2019/0214609 A1    Jul. 11, 2019

(30) Foreign Application Priority Data
Dec. 21, 2017    (FR) .................................... 17 62744

(51) Int. Cl.
*H01M 2/02*    (2006.01)
*H01G 11/28*    (2013.01)
(Continued)

(52) U.S. Cl.
CPC .......... *H01M 2/0287* (2013.01); *H01G 11/04* (2013.01); *H01G 11/28* (2013.01);
(Continued)

(58) Field of Classification Search
None
See application file for complete search history.

(56) References Cited

U.S. PATENT DOCUMENTS

| 9,356,320 B2 | 5/2016 | Shih et al. |
| 2007/0091543 A1 | 4/2007 | Gasse et al. |
| (Continued) | | |

FOREIGN PATENT DOCUMENTS

| CN | 104465125 | 3/2015 |
| EP | 2 192 638 A1 | 6/2010 |
| (Continued) | | |

OTHER PUBLICATIONS

French Preliminary Search Report dated Aug. 24, 2018 in French Application 17 62744, filed on Dec. 21, 2017 (with English translation of categories of cited documents & Written Opinion).
(Continued)

*Primary Examiner* — Daniel S Gatewood
(74) *Attorney, Agent, or Firm* — Oblon, McClelland, Maier & Neustadt, L.L.P.

(57) ABSTRACT

The present invention relates to a method for producing a microelectronic device successively comprising:
  a formation of a first current collector on a face of a substrate;
  a formation of a first electrode (14) on, and in electrical continuity with, a portion of the first current collector;
  a heat treatment configured to treat the first electrode (14) characterised by the fact that:
    the formation of the first collector comprises a formation of a first collector layer (12) on the face of the substrate and a formation of a second collector layer (13) covering at least one part, called covered part, of the first collector layer (12) and having a first face in contact with the first electrode (14),
    the second collector layer (13) is configured to protect the covered part during the heat treatment, such that the heat treatment does not oxidise said covered part.

14 Claims, 2 Drawing Sheets

Figure 1:
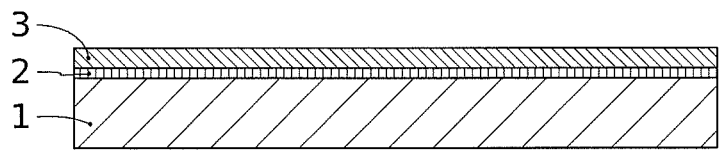
Figure 2:
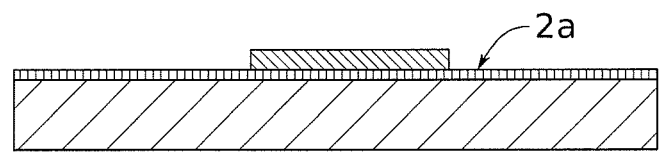

(51) Int. Cl.
      H01G 11/84    (2013.01)
      H01G 11/68    (2013.01)
      H01G 11/70    (2013.01)
      H01G 11/04    (2013.01)

(52) U.S. Cl.
      CPC ............ *H01G 11/68* (2013.01); *H01G 11/70* (2013.01); *H01G 11/84* (2013.01); *H01M 2/0277* (2013.01)

(56) References Cited

U.S. PATENT DOCUMENTS

| | | | |
|---|---|---|---|
| 2010/0129717 A1* | 5/2010 | Bedjaoui | H01M 10/058 429/231.95 |
| 2016/0226032 A1 | 8/2016 | Oukassi et al. | |
| 2017/0222208 A1* | 8/2017 | Yamazaki | H01M 10/4264 |

FOREIGN PATENT DOCUMENTS

| | | |
|---|---|---|
| EP | 3 012 886 A1 | 4/2016 |
| WO | WO 2008/011061 A1 | 1/2008 |
| WO | WO 2015/036720 A1 | 3/2015 |

OTHER PUBLICATIONS

Oukassi S., et al. "Elaboration and characterization of crystalline RF-deposited $V_2O_5$ positive electrode for thin film batteries", Applied Surface Science, (2009), 7 pages.

Kanehori K., et al. "Thin Film Solid Electrolyte and its application to secondary lithium cell", Solid State Ionics, (1983).4 pages.

Chae, C, et al. "A Li-Ion battery using $Li Mn_2O_4$ cathode and $MnO_x/C$ anode", Journal of Power Sources 244, (2013), 8 pages.

Billaud, J, et al. "β-NaMnO2: A high-performance cathode for sodium-ion batteries", J. Am. Chem. Soc., 136, (2014), 6 pages.

R. Berthelot, et al. "Electrochemical investigation of the P2-$NA_xCoO_2$ phase diagram", Nature Materials 10, (2011), 7 pages.

K. Takada, et al. "Solid State lithium battery with oxysulfide glass", Solid State Ionics. (1996) 6 pages.

R. Komiya, et al. "Solid State lithium secondary batteries using an amorphous solid electrolyte in the system ( 100-x) ($0.6Li_2S.0.4SiS_2$)-$xLi_4SiO_4$ obtained by mechanochemical synthesis", Solid State Ionics.140 (2001), 5 pages.

N. Machida, et al. "All-Solid-State Lithium Battery with $LiCo_{0.3}Ni_{0.7}O_2$ fine powder as cathode materials with an amorphous sulfide electrolyte", J. Electrochem. Soc. 149 (2002), 6 pages.

Tatsumisago, M, et al. "Supersonic glasses and glass-ceramics in the $Li_2S-P_2S_5$ system for all-solid-state lithium secondary batteries", Solid State Ionics 225 (2012) , 4 pages.

F. Mizuno et al. "New, Highly ion-Conductive Crystals Precipitated from $Li_2S-P_2S_5$ glasses", Adv. Mater. 17 (2005), 4 pages.

Hayashi, A et al., "Supersonic Glass-ceramic electrolytes for room-temperature rechargeable sodium batteries", Nature Communications 3 (2012), 5 pages.

* cited by examiner

Detail A

REALIZATION OF A MICROELECTRONIC DEVICE COLLECTOR

FIELD OF THE INVENTION

The present invention relates to microelectronic devices having electrode and current collector parts, for example in the field of electrochemical energy storage, but also, for example, in active layer stacks like piezoelectric layers, in particular for producing sensors or actuators.

The invention has an advantageous, but not limiting application in producing microelectronic devices. By microelectronic device, this means any type of device produced with microelectronic means. These devices comprise, in particular, in addition to devices with a purely electronic purpose, micromechanical or electromechanical devices (MEMS, NEMS, etc.) as well as optical or optoelectronic devices (MOEMS, etc.).

A specific, non-limiting benefit of the invention is the production of electrochemical energy storage devices. This includes, in particular, devices of the battery, accumulator or condenser type using an electrolyte.

TECHNOLOGICAL BACKGROUND

By referring, in particular to electrochemical energy storage systems, these are generally produced by successive depositions on a substrate of a first current collector, of a first electrode, of an electrolyte or ionic conductor, of a second electrode, and of a second current collector. An encapsulation, by means of deposition of additional layers, or by extension of cover, is often necessary to protect the system of chemical reactivity with oxygen and water vapour.

The migration of one or more ions between the two electrodes through the electrolyte makes it possible, either to store energy or to deliver it to an external circuit.

An electrochemical device making it possible to store energy is known from patent publication EP 3012886 A1. It shows, for example, in FIG. 9, the formation of a stack on a substrate and conventionally comprising a first collector, a first electrode, an electrolyte, a second electrode, and a second collector. In the stack configuration, it is necessary to have a dielectric element between the first collector and the second electrode and the second collector to avoid a short-circuit. The formation of this electrical insulator is a necessary step and which must be done with precaution for the reliability for producing the device. Commonly, a first current collector made of platinum is used in order to resist heat treatment 300-700° C. under an oxidising atmosphere used to crystallise the first electrode (in particular, $LiCoO_2$ commonly used). However, the collector stack, thus comprising platinum covered with an insulator, is subject to short-circuiting with the second electrode. Indeed, the latter generates whiskers, i.e. needle shapes produced by the platinum through the insulating layer, when the platinum is subjected to heat treatments in the presence of transition metals.

Therefore, there is currently a need for an improved production of devices comprising a collector part and an electrode part, supported by a substrate. It is an aim of the invention, that to overcome at least partially the disadvantages of the current techniques, to do this.

SUMMARY OF THE INVENTION

A non-limiting aspect of the invention relates to a method for producing a microelectronic device comprising, in the stack, on a face of a substrate:
    a first current collector,
    a first electrode,
    a first layer,
    a second electrode,
    a second current collector,
device wherein the first current collector comprises a first collector element comprising an upper portion in contact with the first electrode and a second collector element in electrical continuity with, and extending laterally from, the first collector element beyond the first electrode, the device further comprising a dielectric element configured to electrically insulate the second collector element and at least one from among the second electrode and the second current collector.

Advantageously, the method comprises the formation of an upper portion of the second collector element made of a material different from the material of the upper portion of the first collector element and a transformation, made of a modified material from the material of one part only of the thickness of the upper portion of the second collector element, so as to form a superficial layer made of more electrically resistive modified materials than the material of the upper portion of the second collector element so as to form at least partially the dielectric element.

Another separable aspect of the present invention relates to a microelectronic device comprising, in the stack, on a face of a substrate:
    a first current collector,
    a first electrode,
    an active layer,
    a second electrode,
    a second current collector,
wherein the first current collector comprises a first collector element comprising an upper portion in contact with the first electrode and a second collector element in electrical continuity with, and extending laterally from, the first collector element beyond the first electrode, the device further comprising a dielectric element configured to electrically insulate the second collector element and at least one from among the second electrode and the second current collector.

Advantageously, this device is such that the second collector element comprises an upper portion made of a material different from the material of the upper portion of the first collector element and the dielectric element comprises a superficial layer made of a modified material coming from the material of one part only of the upper portion of the second collector element, the modified material being more electrically resistive than the material of the upper portion of the second collector element. The superficial layer made of a modified material thus forms at least partially the dielectric element.

Thus, at least one part of the dielectric element comes from a transformation of the material of the second collector element. This is not an additional deposition which makes it possible to save such a deposition. Furthermore, the localisation of the formation of the electrical insulator is specific and systematically reliable, since necessarily done above the second collector element. In a non-limiting embodiment, a treatment applied to another part of the device can be benefited from, for example, to the first electrode, to produce the transformation; for example, a heat treatment for crystallising the material of the first electrode can be used to generate the superficial layer of modified material of the second collector element. In the latter case, the production of the dielectric element does not involve any additional step. According to other aspects of embodiments of the invention, the production of the first current collector in several parts (at the very least, a first collector element and a second collector element) makes it possible to select the materials which are the most suitable for each of these parties. In particular, the platinum can be retained for the first element (at the very least in the upper portion thereof) while a more oxidising material such as titanium can be retained for the second element.

BRIEF INTRODUCTION OF THE FIGURES

Figure 8:
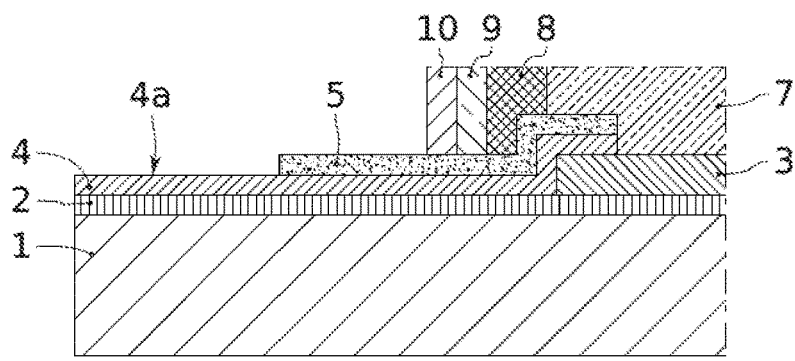
Figure 9:
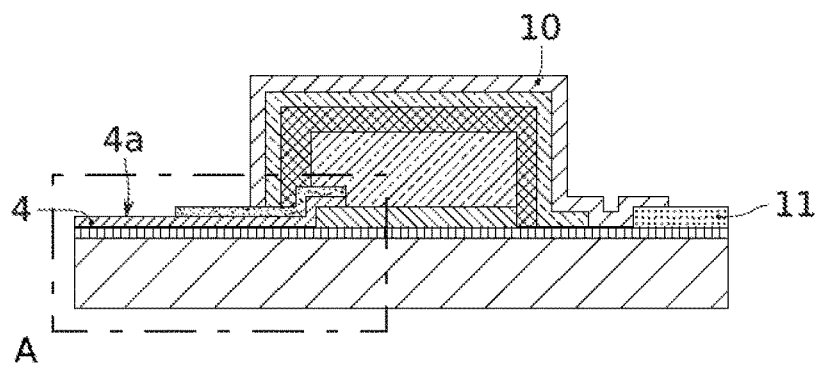
Figure 10:
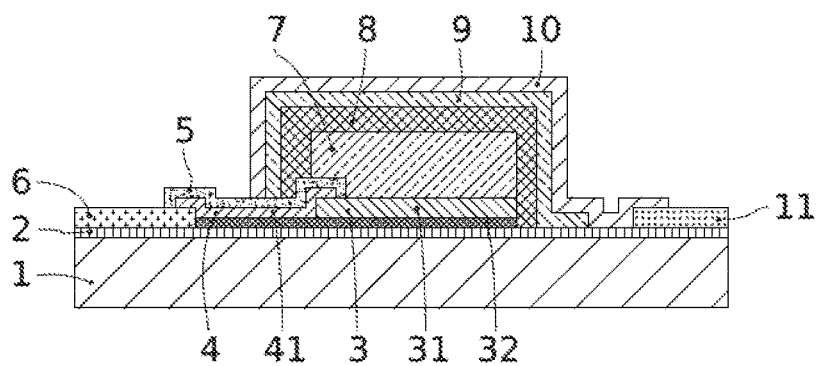

Other characteristics, aims and advantages of the present invention will appear upon reading the following detailed description, opposite the appended drawings, given as non-limiting examples, and on which:

FIGS. 1 to 7 present potential successive steps of the method of the invention;

FIGS. 8-10 respectively present a detailed view and a more general view of a variant of a device of the invention.

The drawings are given as examples and are not limiting of the invention.

They constitute schematic representations of principle, intended to facilitate the understanding of the invention and are not necessarily to the scale of practical applications. In particular, the relative thicknesses of the layers are not representative of reality.

DETAILED DESCRIPTION

It is specified that, in the scope of the present invention, the term "on" or "above" does not compulsorily mean "in contact with". Thus, for example, the deposition of a layer on another layer does not compulsorily mean that the two layers are directly in contact with one another, but this means that one of the layers covers at least partially the other by being, either directly in contact with it, or by being separated from it by a film or also another layer or another element. A layer can moreover be composed of several sub-layers of one same material or different materials.

It is specified that in the scope of the present invention, the thickness of a layer or of the substrate is measured along a direction perpendicular to the surface according to which this layer or this substrate has the maximum extension thereof. A lateral direction extends as directed perpendicularly to the thickness of the substrate.

Some parts of the device of the invention can have an electrical function. Some are used for electrical conduction properties and electrode, collector or equivalent means, elements formed from at least one material having a sufficient electrical conductivity, in the application, to achieve the desired function. Conversely, by electrical or dielectric insulator means, a material which, in the application, ensures an electrical insulation function.

According to the invention, a microelectronic device is produced, comprising at the very least, on a substrate, a first current collector and a first electrode. In the sense of the present application, the term "collector" extends from a part of the device having the function of connecting an electrode to an element external to the device, i.e. situated outside of the stack of layers of the device, generally encapsulated. The term "electrode" itself extends from a part of the device in electrical continuity with an active layer (in particular, an electrolyte, preferably solid, for the case of electrochemical storage, or also a piezoelectric layer, for example). The current collector is connected to the electrode thereof so as to establish an electrical continuity between the two parts; the latter can furthermore come from one or more common layers of materials; in this case, the collector will generally form an excrescence of the electrode, towards the outside of the encapsulated device. This excrescence can be narrower than the electrode itself, it can be a narrow conductive strip directly laterally, relative to the stack.

Generally, the system of the invention comprises a stack of layers making it possible to produce different components of a member, for example, of electrochemical storage. In this case, the stack itself comprises a first collector, a first electrode, an electrolyte (produced advantageously by a solid ionic conductor), a second electrode and a second collector. The electrolyte is a portion inserted between the two separated conductive portions respectively constituted from the first collector and from the first electrode, and from the second electrode and from the second collector. Ionic exchanges between these two conductive portions are made through the electrolyte, advantageously solid, according to the electrochemical energy storage principle.

Figure 7:
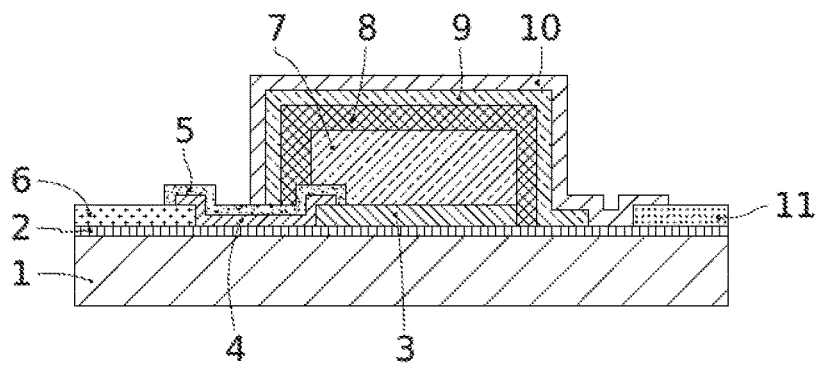

More specifically, this type of system is produced like in FIG. 7 on a base part 1 of a substrate (for example, made of glass or of silicon) and comprises, in the stack: an insulating layer 2 if the base part 1 of the substrate is electrically conductive, a first current collector 3, 4, a first electrode 7, an electrolyte or ionic conductor 8, a second electrode 9, and a second current collector 10. An encapsulation can be achieved by an electrically insulating layer and, possibly, an encapsulation by a final metal layer. In FIG. 7, the current collectors 3, 4; 10, each connected to one of the electrodes, are accessible through the outside of the stack of the electrochemical storage device, for a re-contacting by pins 6, 11. However, resorting to pins 6, 11 or to any other form of re-contact separated from collectors is not absolutely necessary; for example, a part of a collector itself can be used to re-contact; it is particularly the case of a portion of the second collector element of the first current collector as illustrated in FIG. 9 and explained in more detail later.

The first electrode 7 (or positive electrode used in a conventional lithium or sodium accumulator) can potentially be used in a microbattery and moreover, there are numerous examples of materials, like: $LiCoO_2$, $V_2O_5$, $TiS_2$, $LiMn_2O_4$, $NaMnO_2$, $NaCoO_2$, etc.

The solid electrolyte or glass-based superionic material are among the best candidates for inorganic solid electrolytes applicable to any entirely solid battery. A large selection of sulphides and oxysulfide electrolyte vitreous systems, as well as a series of superionic sulphide ceramic glass $Li_2S$—$P_2S_5$, of which the $Li^+$ ion conductivity is comparable to that of liquid electrolytes. Concerning the electrolyte for sodium batteries, there is the same glass family, for example, $Na_3PS_4$.

It will be noted, that in the configuration of FIG. 7, like in that of the variant presented in FIG. 9, the first electrode 7 is quite broadly covered by the active electrolyte layer 8, in particular on the upper face of the first electrode 7, but also on the flanks thereof. Likewise, the second electrode 9 broadly covers the electrolyte 8, on the upper face thereof, but also on the flanks thereof. The situation is similar for the covering of the second collector 10. Through this configuration, a foot part of the second electrode 9 and/or a foot part of the second collector 10 is extended in the direction of the upper face of the substrate even though it could have contact there between one or the other of these parties and the first current collector. To avoid such a situation, a dielectric element is resorted to, inserted between the conductive elements intended to remain electrically separated around the electrolyte 8.

To achieve the result of FIG. 7, below a method is described, following the order of FIGS. 1 to 6.

The invention can be implemented on the base of a substrate 1 made of any material, and in particular those used in the field of microelectronics, for example, semiconductors such as silicon. If the base 1 of the substrate is of the electrically conductive type, preferably an electrically insulating layer 2 is added to it, of which the exposed face 2a will receive the stack constituting the electrochemical device. Thus, in FIG. 1, a cross-section has been represented, illustrating such a substrate with a dielectric layer above which a first layer 3 of first collector is formed. The thickness thereof can be of between 50 and 200 nm, for example.

Typically, for the deposition of this layer and, advantageously for the deposition of other stack layers, a physical vapour deposition technique can be used.

The layer corresponding to the reference 3 is intended to form a first part of the current collector. In the case of the illustrations, it is a first collector element 3 intended to form the electrical continuity with the lower face of the first electrode 7. For example, the upper face of the first collector element 3 can have shapes and dimensions equivalent to those of the lower face of the first electrode 7. For shape this part of the collector, in FIG. 2, the definition of a corresponding pattern has been illustrated, from the layer previously deposited in FIG. 1. A photolithography step as well as a wet engraving step, making it possible to produce a pattern for the first collector element 3. According to the invention, the first collector element is preferably made of platinum. This material is actually practically stainless even though it is not sensitive to possible later treatment steps such as heat treatments, likely to affect, in particular by oxidation, other materials. Also, FeGAl or $MoSi_x$ can also be resorted to.

Figure 3:
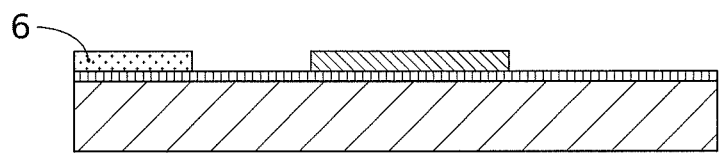

In FIG. 3, a re-contact pin 6 for the first current collector is produced. Purely for information purposes, this pin can be made of aluminium. It can also be made of a material that is very slightly oxidising, like those indicated for the first element 3. It can be between 50 and 500 nm thick. It can come from deposition phases, then photolithography and engraving phases. The pin 6 is offset laterally, relative to the pattern of the first collector element 3.

Then, a layer for forming a second collector element 4 is produced. Indeed, in a preferred embodiment of the invention, the first collector is made of at least two juxtaposed parts, which makes it possible to differentiate the materials of the collector exposed during a treatment; this treatment ensures a transformation of one of the materials, to produce an electrical insulator.

Figure 4:
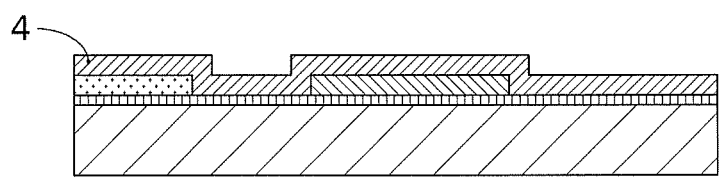
Figure 5:
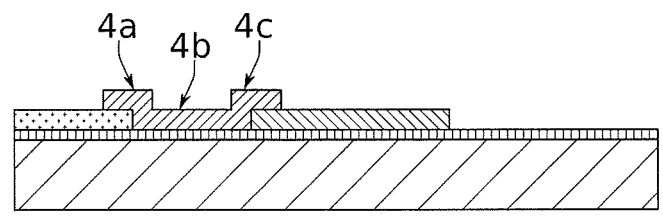

In the case of FIG. 4, it is a solid plate deposition covering the parts formed beforehand. It is thus about shaping the second collector element 4 as in the case of FIG. 5. Titanium can be used for this part. All the electrically conductive materials can be suitable, like Ti, Al, Ni, Ta, Hf, by being advantageously not very expensive, in particular by avoiding platinum. As indicated above, according to the invention, the materials used for the first collector element 3 and for the second collector element 4 are advantageously different. For the second collector element 4, a material, more sensitive to a transformation will be used, configured to modify a material so as to make it more dielectric, i.e. to increase the electrical resistivity thereof. In particular, the material used for the second collector element 4 can be more sensitive to an oxidation or to a nitridation.

In this scenario, a pattern of second collector 4 is defined, for example by photolithography then engraving, connecting the pin 6 and the first collector element 3. At the very least, the second collector element comprises a portion 4b arranged above the upper face 2a of the substrate laterally connecting the two connector elements. Furthermore, the case represented shows the parts 4a and 4c forming an edge, respectively above the pin 6 and the first collector element 3.

It will be noted, that the examples corresponding to the figures of FIGS. 1 to 9, the collector elements are each made of one single layer.

It is however possible to arrange several layers in the stack for either of the collector elements 3, 4. For example, as shown in FIG. 10, a titanium layer 32 can be used as an underlying layer for a platinum layer (for example) so as to construct the first collector element 3 having an upper layer 31.

Possibly, this titanium layer can also be used to constitute, fully or partially, the second collector having an upper layer 41, the pattern coming from the titanium layer extending thus laterally beyond the platinum pattern. The examples of titanium and of platinum are indicative.

The expression "upper portion" extends in the present invention as of the layer of one of the first and second collector elements, made of a given material, and situated in said collector element so as to form the highest part with respect to the substrate. If a collector element only comprises a layer of a material, the upper portion extends from the substrate up to the upper face of said collector element. If the collector element in question has several layers of different materials, the upper portion is that the farthest away from the substrate. It is this portion which contacts the first electrode, in the case of the first conductive element. It will be seen, that it is this portion of the second conductive element, to which is applied a transformation of a part of the thickness, from the upper face of said portion.

A second collector element 4 of the same thickness as the first collector element can be formed.

Figure 6:
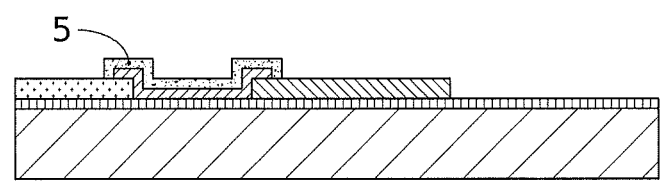

FIG. 6 illustrates a step of transformation applied to this second element, so as to produce a superficial layer 5 of a modified material from the material of the second collector element 4. The modified material is sufficiently insulating to form a dielectric element which will be used to insulate the first current collector from the other layers, such as the second electrode and the second collector.

Advantageously, it is an oxide (coming from an oxidation) or a nitride (coming from a nitridation) of the material of the layer 4 which was exposed during the transformation. This transformation is only partial, such that the second collector element 4 is ultimately divided into:
 an electrically insulating superficial part;
 an underlying electrically conductive part from the first electrode towards the outside of the device.

According to the example, wherein the material to be transformed is titanium and when the transformation is an oxidation, transformation kinetics can, for example, be noted, according to the following table:

| Titanium layer thickness ($\mu m$) | Oxidation conditions | | $TiO_2$ layer thickness obtained ($\mu m$) |
|---|---|---|---|
| | Temp. (° C.) | Duration (h) | |
| 0.06 | 550 | 10 | 0.10 |
| 0.12 | 550 | 10 | 0.20 |
| 0.18 | 550 | 10 | 0.31 |
| 0.24 | 650 | 10 | 0.41 |
| 0.3 | 650 | 10 | 0.51 |

It is noted, that the oxidation produces an oxide increase, of which the thickness quickly becomes notable and ensures the dielectric function thereof. A non-zero thickness of original titanium however remains below this oxide.

The superficial layer 5 can, for example, have an electrical resistivity greater than or equal to $10^6$ Ω·cm. That of the underlying part is, for example, less than or equal to $10^{-6}$ Ω·cm. The layer 5 preferably has a thickness greater than 50 nm; the underlying conductive layer preferably has a thickness greater than 30 nm.

By simplification, corresponding to a first embodiment of the invention, FIG. 6 illustrates the transformation step before the embodiment of other parts of the device, and in particular, before the production of the first electrode 7. For that, it is possible, even advantageous, to benefit from heat treatment which can be necessary for other parts of the device, so as to transform the material of the second collector element 4.

In particular, in the case of an electrochemical device, a heat treatment for crystallising the first electrode is resorted to. The transformation of the second collector element 4 can be produced by this treatment. Below, an example is given of treatment in this context. Thus, a step dedicated to the transformation is saved. However, such a treatment, for example, by a thermal oxidation annealing, could be produced before the production of other parts of the device.

The phase for forming the first electrode is produced, thanks to the deposition of a first electrode 7 layer. Generally, the positive electrode can be LICO (contraction of the term Lithium-Cobalt); it can be deposited by PVD, in order to obtain a layer thickness, in particular of between 3 µm and 20 µm.

A photolithography step, as well as a wet engraving step, make it possible for the production of a first electrode 7 pattern, such as represented in FIG. 7. In this configuration, the lower face of the first electrode 7 is in contact with the upper face of the first collector element. The engraving is done, for example, in a $H_2SO_4/H_2O_2/H_2O$ (1/5/32) bath, the engraving speed being of around 6 µm/min.

As indicated above, the production of the first electrode 7 involves, generally, a heat treatment. It must be noted, that the latter can possibly be produced before the shaping of the first electrode pattern. The heat treatment can be an annealing under an oxidising atmosphere at a temperature greater than or equal to 300° C., possibly greater than or equal to 500° C., even greater than or equal to 700° C. Coming from this treatment, the crystalline structure of the first electrode is fixed.

By PVD deposition in particular, the electrolyte 8, preferably LiPON, in particular 1.5 µm thick, as well as the negative electrode 9, in particular 100 nm thick, for example made of silicon, and the second collector 10, in particular 1 mm thick, for example made of Cu or Ti, will be successively deposited. These portions can, at this stage, be shaped. For example, a photolithography will make it possible to localise the future patterns of these parts, which will then be created by a plasma or wet engraving with suitable solutions. FIG. 7 gives a result of this.

The case of FIG. 9 is close to the preceding one, in that the device comprises an insulator there, coming from a transformation of the first collector.

In this case, a part, here distal, of the superficial part 5 has however been removed, to expose the surface 4a of the second collector element 4, for a re-contact in this place. This removal can be localised at any place, suitable for the electrical re-contact, place separate from the electrical insulation zone of the first collector. As is shown in more detail in FIG. 8, it is thus no longer essential to provide a re-contact pin in this place.

Except for any specific indication on the contrary, the technical characteristics described in detail for a given embodiment can be combined with the technical characteristics described in the context of other embodiments described as non-limiting examples, those of which explained in detail above.

The example given in reference to the drawings falls into the field of electrochemical energy storage, by using an electrolyte, advantageously in the form of a solid ionic conductor. However, other microelectronic devices relate to the present invention, by implementing equivalent steps for the production of the first collector and of the first electrode, the following steps could vary according to the application. For example, the invention can be applied to electroactive-type active layers, in particular piezoelectric, in sensors or in actuators, in particular. The electrolyte is therefore thus replaced by a piezoelectric layer, then covered by the second electrode and by the second collector.

Further to the detailed review above of embodiments of the invention, below, optional characteristics are stated, which can possibly be used according to any association or alternatively:

The transformation comprises an oxidation or a nitridation.

Advantageously, the material of the upper portion of the second collector element 4 is selected as more oxidising than the material of the upper portion of the first collector element 3.

Preferably, a step of heat treating the first electrode 7 is carried out, said step being configured to produce the transformation.

The first collector element 3 is formed with a layer, underlying the upper layer of the first collector.

The underlying layer also forms the upper layer of the second collector element 4.

According to a preferred embodiment, the method comprises the formation of the active layer, in contact with an upper face of the first electrode 7, a formation of the second electrode 9 in contact with an upper face of the active layer and a formation of the second collector 10 in electrical continuity with the second electrode 9.

The formation of the second electrode 9 and the formation of the second collector 10 are configured such that at least one from among the second electrode 9 and the second collector 10 is electrically insulated from the first collector by contact on the superficial layer.

The method possibly comprises a partial removal of the superficial layer so as to expose the material of the upper portion of the second collector element in an electrical re-contact zone.

Preferably, the modified material is an oxide or a nitride of the material of the upper portion of the second collector element 4.

The material of the upper portion of the second collector element 4 is more oxidising than the material of the upper portion of the first collector element 3.

The material of the upper portion of the first collector element 3 is platinum.

Preferably, the first collector comprises an underlying layer of which a part is situated below the upper portion of the first collector element 3 and of which another part forms the upper portion of the second collector element 4.

The invention claimed is:

1. A method for producing a microelectronic device comprising, in a stack on a face of a substrate:
   a first current collector,
   a first electrode,
   an active layer,
   a second electrode,
   a second current collector,
   wherein the first current collector includes a first collector element having an upper portion in contact with the first electrode and a second collector element in electrical continuity with, and extending laterally from, the first collector element beyond the first electrode, the device further includes a dielectric element configured to electrically insulate the second collector element from at least one of the second electrode and the second current collector,
   wherein the method comprises formation of an upper portion of the second collector element to be made of a material different from a material of the upper portion of the first collector element, and a transformation made of a modified material, the transformation being made from a modification of a portion of a material of the upper portion of the second collector element so as to form a superficial layer made of the modified material, the superficial layer forming at least partially the dielectric element,
   wherein the superficial layer is more electrically resistive than the material of the upper portion of the second collector element.

2. The method according to claim 1, wherein the transformation comprises an oxidation or a nitridation.

3. The method according to claim 1, wherein the material of the upper portion of the second collector element is selected as more oxidising than the material of the upper portion of the first collector element.

4. The method according to claim 1, comprising a step of heat treating the first electrode, said step being configured to produce the transformation.

5. The method according to claim 1, wherein the first collector element is formed with a layer underlying an upper layer of the first collector element.

6. The method according to claim 5, wherein the underlying layer also forms an upper layer of the second collector element.

7. The method according to claim 1, comprising, a formation of the active layer in contact with an upper face of the first electrode, a formation of the second electrode in contact with an upper face of the active layer and a formation of the second collector element in electrical continuity with the second electrode.

8. The method according to claim 7, wherein the formation of the second electrode and the formation of the second collector are configured such that at least one from among the second electrode and the second collector element are electrically insulated from the first collector element by contact on the superficial layer.

9. The method according to claim 1, comprising a partial removal of the superficial layer, so as to expose the material of the upper portion of the second collector element in an electrical re-contact zone.

10. A microelectronic device comprising, in a stack on a face of a substrate:
    a first current collector,
    a first electrode,
    an active layer,
    a second electrode,
    a second current collector,
    wherein the first current collector includes a first collector element having an upper portion in contact with the first electrode and a second collector element in electrical continuity with, and extending laterally from, the first collector element beyond the first electrode,
    the device further comprising a dielectric element configured to electrically insulate the second collector element from at least one of the second electrode and the second current collector,
    wherein the second collector element includes an upper portion made of a material different from a material f the upper portion of the first collector element and the dielectric element includes a superficial layer made of a modified material coming from a portion of a material of the second collector element, and
    wherein the modified material is more electrically resistive than the material of the upper portion of the second collector element.

11. The device according to claim 10, wherein the modified material is an oxide or a nitride of material of the upper portion of the second collector element.

12. The device according to claim 10, wherein the material of the upper portion of the second collector element is more oxidising than the material of the upper portion of the first collector element.

13. The device according to claim 10, wherein the material of the upper portion of the first collector element is platinum.

14. The device according to claim 10, wherein the first collector comprises an underlying layer, of which a part is situated below the upper portion of the first collector element and of which another part forms the upper portion of the second collector element.

* * * * *